(12) United States Patent
Goleski et al.

(10) Patent No.: US 9,869,372 B2
(45) Date of Patent: Jan. 16, 2018

(54) MULTI-SPEED TRANSMISSION

(71) Applicant: Ford Global Technologies, LLC, Dearborn, MI (US)

(72) Inventors: Gregory Daniel Goleski, Rochester Hills, MI (US); Reid Alan Baldwin, Howell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 221 days.

(21) Appl. No.: 14/826,512

(22) Filed: Aug. 14, 2015

(65) Prior Publication Data

US 2015/0354670 A1 Dec. 10, 2015

Related U.S. Application Data

(63) Continuation-in-part of application No. 13/855,782, filed on Apr. 3, 2013, now Pat. No. 9,145,953, which is a continuation-in-part of application No. 13/480,960, filed on May 25, 2012, now Pat. No. 8,545,362.

(60) Provisional application No. 61/715,706, filed on Oct. 18, 2012.

(51) Int. Cl.
*F16H 3/66* (2006.01)

(52) U.S. Cl.
CPC ....... *F16H 3/66* (2013.01); *F16H 2200/0069* (2013.01); *F16H 2200/2012* (2013.01); *F16H 2200/2046* (2013.01)

(58) Field of Classification Search
CPC ...... F16H 2200/2012; F16H 3/62; F16H 3/66; F16H 2200/2046; F16H 2200/2097
See application file for complete search history.

(56) References Cited

U.S. PATENT DOCUMENTS

| | | | |
|---|---|---|---|
| 6,053,839 | A | 4/2000 | Baldwin et al. |
| 7,749,129 | B2 | 7/2010 | Wittkopp et al. |
| 7,789,792 | B2 | 9/2010 | Kamm et al. |
| 7,798,934 | B2 | 9/2010 | Hart et al. |
| 7,803,084 | B2 | 9/2010 | Phillips et al. |
| 7,887,457 | B2 | 2/2011 | Wittkopp et al. |
| 8,007,394 | B2 | 8/2011 | Phillips et al. |
| 8,007,397 | B2 | 8/2011 | Phillips et al. |
| 8,016,708 | B2 | 9/2011 | Diosi et al. |
| 8,052,566 | B2 | 11/2011 | Wittkopp et al. |
| 8,231,495 | B2 | 7/2012 | Gumpoltsberger et al. |
| 8,251,855 | B2 | 8/2012 | Diosi et al. |
| 8,303,455 | B2 | 11/2012 | Gumpoltsberger et al. |
| 8,545,362 | B1 | 10/2013 | Goleski et al. |
| 8,556,765 | B2 | 10/2013 | Bockenstette et al. |

(Continued)

OTHER PUBLICATIONS

Chinese Office Action dated Jul. 8, 2016 for Corresponding S.N. 201310190124.6, 5 pages.

(Continued)

*Primary Examiner* — Stacey Fluhart
(74) *Attorney, Agent, or Firm* — James Dottavio; Brooks Kushman P.C.

(57) ABSTRACT

A family of transmission gearing arrangements produces ten forward and one reverse speed ratios by selective engagement of various combinations of four shift elements. Each disclosed transmission includes four planetary gearsets and six shift elements.

12 Claims, 3 Drawing Sheets

(56) References Cited

U.S. PATENT DOCUMENTS

| | | | |
|---|---|---|---|
| 8,617,021 B1* | 12/2013 | Goleski | F16H 3/666 475/277 |
| 2004/0121877 A1 | 6/2004 | Lee et al. | |
| 2006/0205556 A1* | 9/2006 | Klemen | F16H 3/66 475/296 |
| 2008/0261755 A1 | 10/2008 | Phillips et al. | |
| 2008/0261757 A1 | 10/2008 | Wittkopp et al. | |
| 2009/0088289 A1 | 4/2009 | Baldwin | |
| 2010/0234167 A1 | 9/2010 | Lee et al. | |
| 2010/0279814 A1 | 11/2010 | Brehmer | |
| 2011/0045941 A1* | 2/2011 | Gumpoltsberger | F16H 3/66 475/275 |
| 2011/0275472 A1 | 11/2011 | Phillips et al. | |
| 2011/0294617 A1 | 12/2011 | Seo et al. | |
| 2012/0053008 A1 | 3/2012 | Beck et al. | |
| 2013/0150201 A1 | 6/2013 | Knox et al. | |
| 2013/0345014 A1 | 12/2013 | Mellet et al. | |
| 2014/0080656 A1* | 3/2014 | Lippert | F16H 3/66 475/275 |
| 2014/0100073 A1 | 4/2014 | Lee | |
| 2014/0106923 A1 | 4/2014 | Burgerson et al. | |
| 2014/0106925 A1 | 4/2014 | Mellet et al. | |
| 2014/0162830 A1* | 6/2014 | Mellet | F16H 3/66 475/269 |

OTHER PUBLICATIONS

Chinese Office Action dated Jun. 28, 2016 for Corresponding S.N. 201310193889.5, 6 pages.

\* cited by examiner

MULTI-SPEED TRANSMISSION

CROSS-REFERENCE TO RELATED APPLICATIONS

This application is a continuation-in-part of U.S. patent application Ser. No. 13/855,782 filed Apr. 3, 2013, now U.S. Pat. No. 9,145,953, the disclosure of which is incorporated by reference herein. U.S. patent application Ser. No. 13/855,782, in turn, is a continuation-in-part of U.S. application Ser. No. 13/480,960 filed May 25, 2012, now U.S. Pat. No. 8,545,362, and claims the benefit of U.S. Provisional Application No. 61/715,706, filed Oct. 18, 2012, the disclosures of which are incorporated in their entirety by reference herein.

TECHNICAL FIELD

This disclosure relates to the field of automatic transmissions for motor vehicles. More particularly, the disclosure pertains to an arrangement of gears, clutches, and the interconnections among them in a power transmission.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

SUMMARY OF THE DISCLOSURE

A transmission includes a housing, input, output, and intermediate shafts, and four planetary gearsets. The sun gear of the first planetary gearset is selectively coupled to the housing. The carrier of the first planetary gearset is fixedly coupled to the input shaft. The sun gear of the second planetary gearset is selectively coupled to the input shaft and selectively coupled to the intermediate shaft. The carrier of the second planetary gearset is fixedly coupled to the output shaft. The sun gear of the third planetary gearset is fixedly coupled to the ring gear of the first planetary gearset and selectively coupled to the intermediate shaft. The ring gear of the third planetary gearset is selectively coupled to the intermediate shaft. The carrier of the third planetary gearset is fixedly coupled to the ring gear of the second planetary gearset. The sun gear of the fourth planetary gearset is coupled, either fixedly or selectively, to the sun gear of the first planetary gearset. The ring gear of the fourth planetary gearset is coupled, either fixedly or selectively, to the housing. The carrier of the first planetary gearset is coupled, either fixedly or selectively, to the ring gear of the second gearset and the carrier of the fourth gearset.

In another embodiment, a transmission includes a housing, an input shaft, an output shaft, and four planetary gearsets. The sun gear of the first planetary gearset is selectively coupled to the housing. The carrier of the first planetary gearset is fixedly coupled to the input shaft. The sun gear of the second planetary gearset is selectively coupled to the input shaft. The carrier of the second planetary gearset is fixedly coupled to the output shaft. The sun gear of the third planetary gearset is coupled to the ring gear of the first planetary gearset. The carrier of the third planetary gearset may be coupled to the second ring gear. The sun gear of the fourth planetary gearset is selectively coupled to the sun gear of the first planetary gearset. The ring gear of the fourth planetary gearset is fixedly held against rotation by the housing. The carrier of the fourth planetary gearset is fixedly coupled to the second ring gear. The transmission may also include an intermediate shaft coupled to the third ring gear and first and second clutches. The first clutch may selectively couple the intermediate shaft to the sun gear of the third planetary gearset. The second clutch may selectively couple the intermediate shaft to the sun gear of the second planetary gearset.

DETAILED DESCRIPTION

Figure 1:
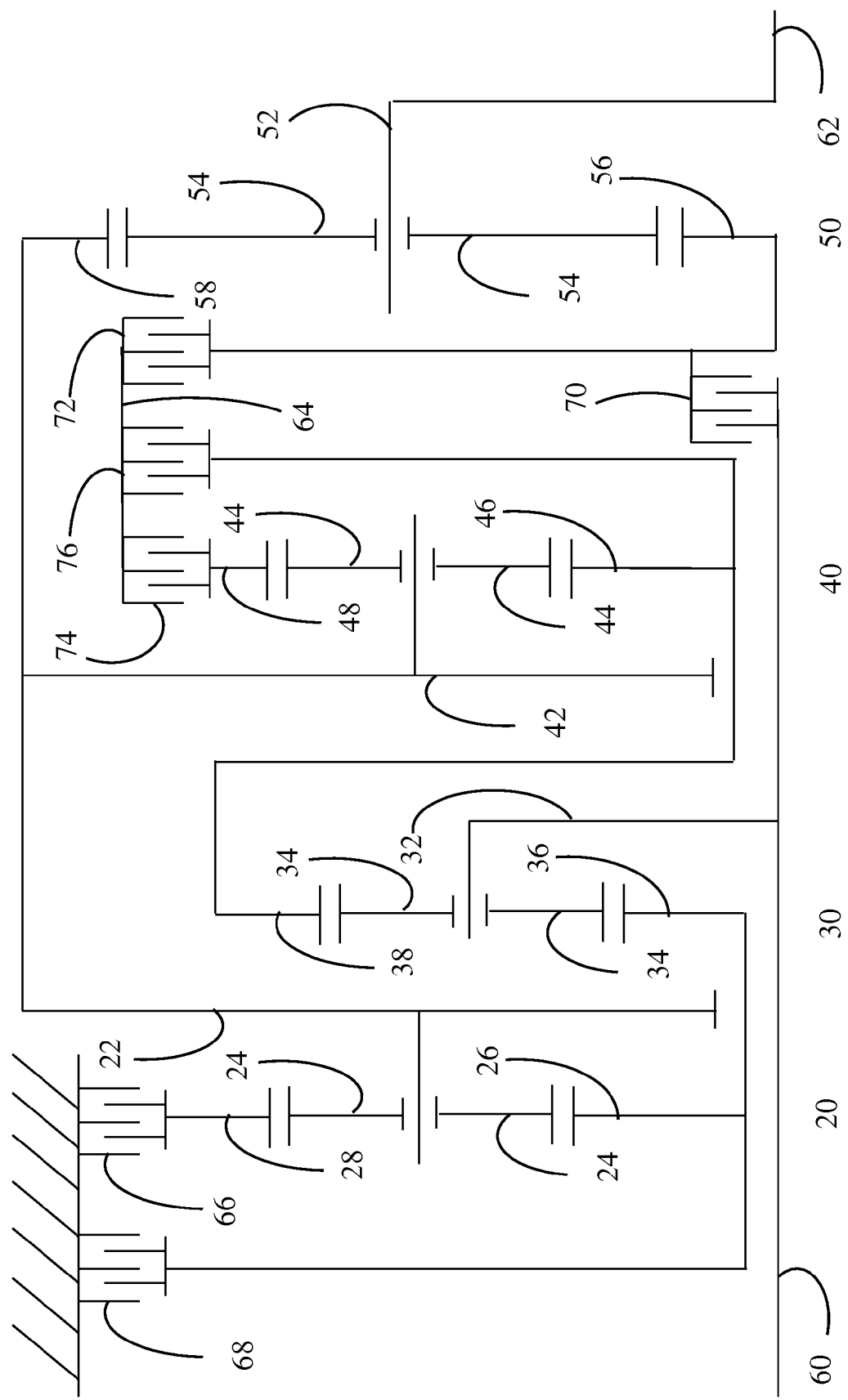
FIG. 1 is a schematic diagram of a first transmission gearing arrangement.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A gearing arrangement is a collection of rotating elements and shift elements configured to impose specified speed relationships among the rotating elements. Some speed relationships, called fixed speed relationships, are imposed regardless of the state of any shift elements. Other speed relationships, called selective speed relationships, are imposed only when particular shift elements are fully engaged. A linear speed relationship exists among an ordered list of rotating elements when i) the first and last rotating element in the group are constrained to have the most extreme speeds, ii) the speeds of the remaining rotating elements are each constrained to be a weighted average of the first and last rotating element, and iii) when the speeds of the rotating elements differ, they are constrained to be in the listed order, either increasing or decreasing. A discrete ratio transmission has a gearing arrangement that selectively imposes a variety of speed ratios between an input shaft and an output shaft.

A group of gearing elements are fixedly coupled to one another if and only if they are constrained to rotate at the same speed about the same axis in all operating conditions. Gearing elements can be fixedly coupled by spline connections, welding, press fitting, machining from a common solid, or other means. Slight variations in rotational displacement between fixedly coupled elements can occur such as displacement due to lash or shaft compliance. One or more gearing elements that are all fixedly coupled to one another may be called a shaft. In contrast, two gearing elements are selectively coupled by a shift element if and only if the shift element constrains them to rotate at the same speed about the same axis whenever the shift element is fully engaged and they are free to rotate at distinct speeds in at least some other operating condition. A shift element that holds a gearing element against rotation by selectively coupling it to the housing is called a brake. A shift element that selectively couples two or more gearing elements to one another is called a clutch. Shift elements may be actively controlled devices such as hydraulically or electrically actuated clutches or brakes or may be passive devices such as one way clutches or brakes. Two gearing elements are coupled if they are either fixedly coupled or selectively coupled.

An example transmission is schematically illustrated in FIG. 1. The transmission utilizes four simple planetary gearsets 20, 30, 40, and 50. A planet carrier 22 rotates about a central axis and supports a set of planet gears 24 such that the planet gears rotate with respect to the planet carrier. External gear teeth on the planet gears mesh with external gear teeth on a sun gear 26 and with internal gear teeth on a ring gear 28. The sun gear and ring gear are supported to rotate about the same axis as the carrier. Gearsets 30, 40, and 50 are similarly structured.

A suggested ratio of gear teeth for each planetary gearset is listed in Table 1.

TABLE 1

| Ring 28/Sun 26 | 2.20 |
| Ring 38/Sun 36 | 1.75 |
| Ring 48/Sun 46 | 1.60 |
| Ring 58/Sun 56 | 3.70 |

In the transmission of FIG. 1, sun gear 26 is fixedly coupled to sun gear 36; carrier 22, carrier 42, and ring gear 58 are mutually fixedly coupled; ring gear 38 is fixedly coupled to sun gear 46; input shaft 60 is fixedly coupled to carrier 32; and output shaft 62 is fixedly coupled to carrier 52. Ring gear 28 is selectively held against rotation by brake 66 and sun gears 26 and 36 are selectively held against rotation by brake 68. Input shaft 60 is selectively coupled to sun gear 56 by clutch 70. Intermediate shaft 64 is selectively coupled to ring gear 48 by clutch 74, selectively coupled to sun gear 56 by clutch 72, and selectively coupled to ring gear 38 and sun gear 46 by clutch 76.

As shown in Table 2, engaging the clutches and brakes in combinations of four establishes ten forward speed ratios and one reverse speed ratio between input shaft 60 and output shaft 62. An X indicates that the clutch is required to establish the speed ratio. An (X) indicates the clutch can be applied but is not required. In $1^{st}$ gear, either clutch 74 or clutch 76 can be applied instead of applying clutch 72 without changing the speed ratio. When the gearsets have tooth numbers as indicated in Table 1, the speed ratios have the values indicated in Table 2.

TABLE 2

|  | 66 | 68 | 70 | 72 | 74 | 76 | Ratio | Step |
|---|---|---|---|---|---|---|---|---|
| Rev | X | X |  | X | X |  | −4.79 | 102% |
| $1^{st}$ | X | X | X | (X) |  |  | 4.70 |  |
| $2^{nd}$ | X | X |  | X |  | X | 2.99 | 1.57 |
| $3^{rd}$ | X |  | X | X |  | X | 2.18 | 1.37 |
| $4^{th}$ | X |  |  | X | X | X | 1.80 | 1.21 |
| $5^{th}$ | X |  | X |  | X | X | 1.54 | 1.17 |
| $6^{th}$ | X |  |  | X | X |  | 1.29 | 1.19 |
| $7^{th}$ |  |  | X | X | X | X | 1.00 | 1.29 |
| $8^{th}$ |  | X | X | X | X |  | 0.85 | 1.17 |
| $9^{th}$ |  | X | X |  | X | X | 0.69 | 1.24 |
| $10^{th}$ |  | X |  | X | X | X | 0.64 | 1.08 |

Figure 2:
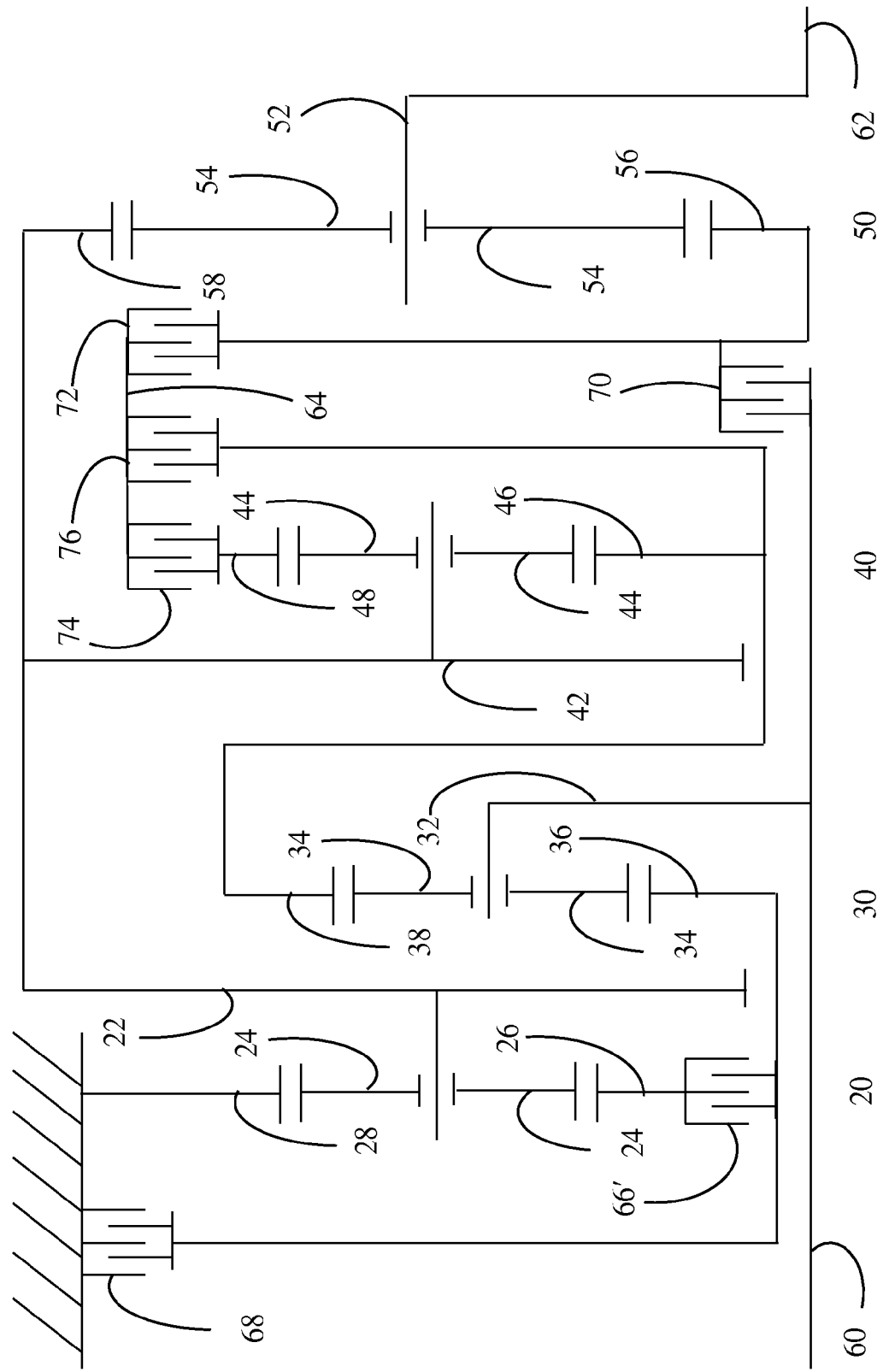
FIG. 2 is a schematic diagram of a second transmission gearing arrangement.

Another transmission gearing arrangement is illustrated schematically in FIG. 2. In the transmission of FIG. 2, sun gear 36 is selectively coupled to sun gear 26 by clutch 66' and selectively held against rotation by brake 68; ring gear 28 is fixedly held against rotation; carrier 22, carrier 42, and ring gear 58 are mutually fixedly coupled; ring gear 38 is fixedly coupled to sun gear 46; input shaft 60 is fixedly coupled to carrier 32; and output shaft 62 is fixedly coupled to carrier 52. Input shaft 60 is selectively coupled to sun gear 56 by clutch 70. Intermediate shaft 64 is selectively coupled to ring gear 48 by clutch 74, selectively coupled to sun gear 56 by clutch 72, and selectively coupled to ring gear 38 and sun gear 46 by clutch 76. The arrangement of FIG. 2 is also operated according to the clutch application chart of Table 2, applying clutch 66' as opposed to brake 66.

Figure 3:
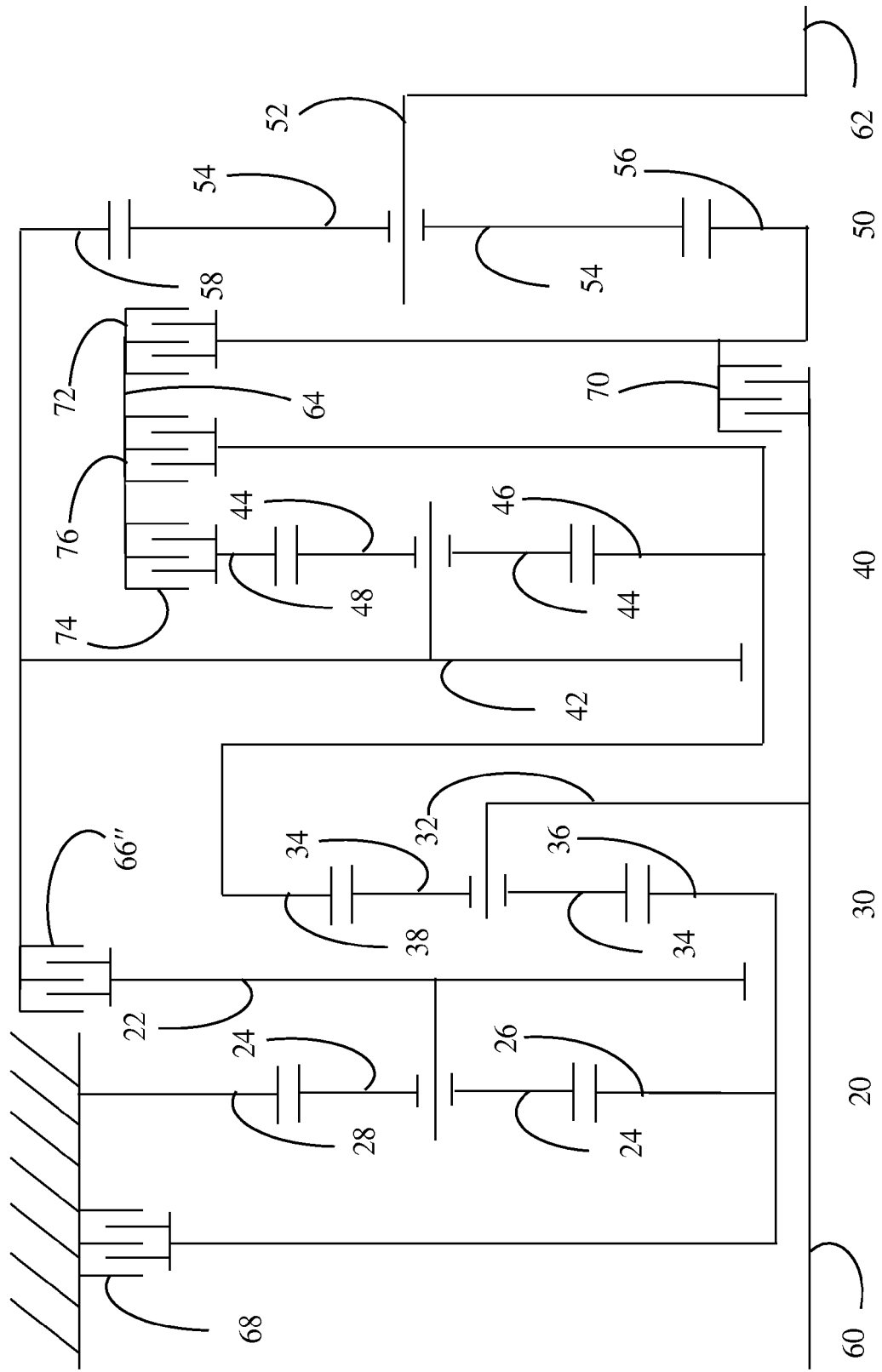
FIG. 3 is a schematic diagram of a third transmission gearing arrangement.

Another transmission gearing arrangement is illustrated schematically in FIG. 3. In the transmission of FIG. 3, sun gear 26 is fixedly coupled to sun gear 36; ring gear 28 is fixedly held against rotation; carrier 22, carrier 42 is fixedly coupled to ring gear 58; ring gear 38 is fixedly coupled to sun gear 46; input shaft 60 is fixedly coupled to carrier 32; and output shaft 62 is fixedly coupled to carrier 52. Sun gears 26 and 36 are selectively held against rotation by brake 68. Carrier 22 is selectively coupled to carrier 42 and ring gear 58 by clutch 66". Input shaft 60 is selectively coupled to sun gear 56 by clutch 70. Intermediate shaft 64 is selectively coupled to ring gear 48 by clutch 74, selectively coupled to sun gear 56 by clutch 72, and selectively coupled to ring gear 38 and sun gear 46 by clutch 76. The arrangement of FIG. 2 is also operated according to the clutch application chart of Table 2, applying clutch 66" as opposed to brake 66.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A transmission comprising:
a housing;
input, output, and intermediate shafts;
a first planetary gearset having a first sun gear selectively coupled to the housing, a first ring gear, a first carrier fixedly coupled to the input shaft, and a set of planet gears in continuous meshing engagement with the first sun gear and the first ring gear;
a second planetary gearset having a second sun gear selectively coupled to the input shaft and selectively coupled to the intermediate shaft, a second ring gear, a second carrier fixedly coupled to the output shaft, and a set of planet gears in continuous meshing engagement with the second sun gear and the second ring gear;
a third planetary gearset having a third sun gear fixedly coupled to the first ring gear and selectively coupled to the intermediate shaft, a third ring gear selectively coupled to the intermediate shaft, a third carrier fixedly coupled to the second ring gear, and a set of planet gears in continuous meshing engagement with the third sun gear and the third ring gear; and
a fourth planetary gearset having a fourth sun gear coupled to the first sun gear, a fourth ring gear coupled to the housing, a fourth carrier coupled to the second ring gear, and a set of planet gears in continuous meshing engagement with the fourth sun gear and the fourth ring gear.

2. The transmission of claim 1 wherein:
the fourth sun gear is fixedly coupled to the first sun gear;
the fourth ring gear is selectively coupled to the housing; and
the fourth carrier is fixedly coupled to the second ring gear.

3. The transmission of claim 1 wherein:
the fourth sun gear is selectively coupled to the first sun gear;
the fourth ring gear is fixedly coupled to the housing; and
the fourth carrier is fixedly coupled to the second ring gear.

4. The transmission of claim 1 wherein:
the fourth sun gear is fixedly coupled to the first sun gear;
the fourth ring gear is fixedly coupled to the housing; and
the fourth carrier is selectively coupled to the second ring gear.

5. A transmission comprising:
a first planetary gearset having a first carrier fixedly coupled to an input, a first sun, and a first ring;
a second planetary gearset having a second carrier fixedly coupled to an output, a second sun, and a second ring
a third planetary gearset having a third carrier fixedly coupled to the second ring, a third sun selectively coupled to the first sun, and a third ring fixedly held against rotation; and
a fourth planetary gearset having a fourth carrier coupled to the second ring and the third carrier, a fourth sun coupled to the first ring, and a fourth ring.

6. The transmission of claim 5 further comprising a first clutch configured to selectively couple the second sun to the input.

7. The transmission of claim 6 further comprising a brake configured to selectively hold the first sun against rotation.

8. The transmission of claim 5 wherein:
the fourth sun is fixedly coupled to the first ring; and
the fourth carrier is fixedly coupled to the second ring and the third carrier.

9. The transmission of claim 8 further comprising:
an intermediate shaft;
a second clutch configured to selectively couple the intermediate shaft to the fourth ring;
a third clutch configured to selectively couple the intermediate shaft to the fourth sun; and
a fourth clutch configured to selectively couple the intermediate shaft to the second sun.

10. A transmission comprising:
a housing;
an input shaft;
an output shaft;
a first planetary gearset having a first sun gear selectively coupled to the housing, a first ring gear, a first carrier fixedly coupled to the input shaft, and a set of planet gears in continuous meshing engagement with the first sun gear and the first ring gear;
a second planetary gearset having a second sun gear selectively coupled to the input shaft, a second ring gear, a second carrier fixedly coupled to the output shaft, and a set of planet gears in continuous meshing engagement with the second sun gear and the second ring gear;
a third planetary gearset having a third sun gear coupled to the first ring gear, a third ring gear, a third carrier coupled to the second ring gear, and a set of planet gears in continuous meshing engagement with the third sun gear and the third ring gear; and
a fourth planetary gearset having a fourth sun gear selectively coupled to the first sun gear, a fourth ring gear fixedly coupled to the housing, a fourth carrier fixedly coupled to the second ring gear, and a set of planet gears in continuous meshing engagement with the fourth sun gear and the fourth ring gear.

11. The transmission of claim 10 further comprising:
an intermediate shaft coupled to the third ring gear;
a first clutch configured to selectively couple the intermediate shaft to the third sun gear; and
a second clutch configured to selectively couple the intermediate shaft to the second sun gear.

12. The transmission of claim 11 wherein:
the third sun gear is fixedly coupled to the first ring gear;
the third ring gear is selectively coupled to the intermediate shaft; and
the third carrier is fixedly coupled to the second ring gear.

* * * * *